(12) United States Patent
Hatanaka et al.

(10) Patent No.: US 9,868,355 B2
(45) Date of Patent: Jan. 16, 2018

(54) PROPULSION CONTROL APPARATUS FOR RAILROAD VEHICLE

(71) Applicants: Keita Hatanaka, Tokyo (JP); Naoki Nishio, Tokyo (JP)

(72) Inventors: Keita Hatanaka, Tokyo (JP); Naoki Nishio, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 278 days.

(21) Appl. No.: 14/759,017

(22) PCT Filed: Feb. 22, 2013

(86) PCT No.: PCT/JP2013/054602
§ 371 (c)(1),
(2) Date: Jul. 2, 2015

(87) PCT Pub. No.: WO2014/128936
PCT Pub. Date: Aug. 28, 2014

(65) Prior Publication Data
US 2015/0343906 A1 Dec. 3, 2015

(51) Int. Cl.
*B60L 3/00* (2006.01)
*B60L 9/18* (2006.01)
(Continued)

(52) U.S. Cl.
CPC .............. *B60L 9/16* (2013.01); *B60L 3/0046* (2013.01); *B60L 3/0061* (2013.01);
(Continued)

(58) Field of Classification Search
CPC .... B60L 3/0023; B60L 3/0046; B60L 3/0061; B60L 3/0069; B60L 3/0092; B60L 7/14;
(Continued)

(56) References Cited

U.S. PATENT DOCUMENTS

| 9,227,516 B2* | 1/2016 | Hatanaka | B60L 9/22 |
| 2004/0216636 A1* | 11/2004 | Emori | B60L 9/18 |
| | | | 105/26.05 |

(Continued)

FOREIGN PATENT DOCUMENTS

| JP | 03-107302 A | 5/1991 |
| JP | 06-022409 A | 1/1994 |

(Continued)

OTHER PUBLICATIONS

International Search Report (PCT/ISA/210) dated May 21, 2013, by the Japanese Patent Office as the International Searching Authority for International Application No. PCT/JP2013/054602.

(Continued)

*Primary Examiner* — Levi Gannon
(74) *Attorney, Agent, or Firm* — Buchanan Ingersoll & Rooney PC

(57) ABSTRACT

A propulsion control apparatus includes a first power converter that operates as a DC/AC converter, a DC/DC converter, or an AC/DC converter, a second power converter, a first control device that controls operations of a first motor and the first power converter, and a second control device that controls operations of a second motor and the second power converter, wherein a power storage device is configured to be able to connect to a second input/output end side and functions as a direct-current power supply that is charged with direct-current power supplied from the second input/output end side or discharges direct-current power to the second input/output end side.

4 Claims, 10 Drawing Sheets

(51) Int. Cl.
*B61C 9/38* (2006.01)
*B60L 9/16* (2006.01)

(52) U.S. Cl.
CPC ........... *B60L 3/0069* (2013.01); *B60L 3/0092* (2013.01); *B60L 9/18* (2013.01); *B61C 9/38* (2013.01); *B60L 2200/26* (2013.01); *B60L 2210/12* (2013.01); *B60L 2210/14* (2013.01); *B60L 2210/30* (2013.01); *B60L 2210/40* (2013.01); *B60L 2220/42* (2013.01); *B60L 2240/526* (2013.01); *B60L 2240/547* (2013.01); *B60L 2240/549* (2013.01); *Y02T 10/648* (2013.01); *Y02T 10/7225* (2013.01); *Y02T 10/7233* (2013.01); *Y02T 10/7241* (2013.01)

(58) Field of Classification Search
CPC ...... B60L 7/16; B60L 9/16; B60L 9/18; B60L 9/20; B60L 9/22; B60L 11/08; B60L 11/18; B60L 2200/26; B60L 2240/526; B60L 2240/547; B60L 2240/549; B61C 9/38; Y02T 10/648
USPC ........................................................ 307/9.1
See application file for complete search history.

(56) References Cited

U.S. PATENT DOCUMENTS

| | | | | |
|---|---|---|---|---|
| 2008/0121136 A1* | 5/2008 | Mari | ....................... | B60L 11/02 105/35 |
| 2008/0288192 A1* | 11/2008 | Kumar | ..................... | B60L 7/18 702/60 |
| 2012/0000739 A1* | 1/2012 | Nogi | ........................ | B60M 3/04 191/50 |
| 2012/0090499 A1* | 4/2012 | Shimada | .................. | B61C 3/02 105/49 |
| 2012/0143407 A1* | 6/2012 | Murthy | ................ | B60T 13/665 701/19 |

FOREIGN PATENT DOCUMENTS

| | | | |
|---|---|---|---|
| JP | 10-104325 A | 4/1998 | |
| JP | 10-155240 A | 6/1998 | |
| JP | 2008-228451 A | 9/2008 | |
| JP | 2009-136142 A | 6/2009 | |
| JP | 2012-050162 A | 3/2012 | |
| JP | 2012-085535 A | 4/2012 | |
| WO | WO 2012/014324 A1 | 2/2012 | |
| WO | WO 2012/014540 A1 * | 2/2012 | ................ B60L 9/18 |

OTHER PUBLICATIONS

Written Opinion (PCT/ISA/237) dated May 21, 2013, by the Japanese Patent Office as the International Searching Authority for International Application No. PCT/JP2013/054602.

Office Action (Notice of Rejection) dated May 12, 2015 by the Japanese Patent Office in Japanese Appl. No. 2015-501199, with English translation. (6 pages).

* cited by examiner

RUNNING WITH POWER FROM OVERHEAD LINE

DURING BRAKING: REGENERATION TO OVERHEAD LINE

RUNNING+CHARGING WITH POWER FROM OVERHEAD LINE

CHARGING WITH POWER FROM MOTOR

RUNNING WITH STORED POWER
(WITHOUT VIA OVERHEAD LINE AND WITHIN VEHICLE)
WHEN OVERHEAD LINE POWER FAILURE OR THE LIKE OCCUR

CHARGING BATTERY WITH REGENERATIVE POWER
WHEN OVERHEAD LINE POWER FAILURE OCCUR

RUNNING WITH POWER FROM OVERHEAD LINE

DURING BRAKING: REGENERATION TO OVERHEAD LINE

RUNNING+CHARGING WITH POWER FROM OVERHEAD LINE

CHARGING WITH POWER FROM MOTOR

RUNNING WITH STORED POWER
(VIA OVERHEAD LINE)
WHEN OVERHEAD LINE POWER FAILURE OR
THE LIKE OCCUR

CHARGING BATTERY WITH REGENERATIVE POWER WHEN
OVERHEAD LINE POWER FAILURE OCCUR (VIA OVERHEAD LINE)

PROPULSION CONTROL APPARATUS FOR RAILROAD VEHICLE

FIELD

The present invention relates to a propulsion control apparatus for a railroad vehicle on which a power storage device is mounted.

BACKGROUND

A conventional propulsion control apparatus for a railroad vehicle on which a power storage device is mounted includes motors, a power storage device, a power conversion device that converts high-voltage direct-current power from the overhead line into alternating-current power to drive the motors, and a power conversion device for charging/discharging the power storage device (for example, Patent Literature 1 described below).

CITATION LIST

Patent Literature

Patent Literature 1: Japanese Patent Application Laid-open No. 2008-228451

SUMMARY

Technical Problem

However, with conventional technologies, a representation of which is Patent Literature 1 described above, it is necessary to provide a power conversion device that converts high-voltage direct-current power from the overhead line into alternating-current power to drive the motors and a power conversion device for charging/discharging the power storage device; therefore, there is a problem in that the cost increases and the size and mass of the apparatus increase. Moreover, with the conventional technologies, when an abnormality occurs in a direct-current common unit, this affects devices connected to the direct-current common unit and thus the reliability may decrease.

The present invention has been achieved in view of the above and an object of the present invention is to provide a propulsion control apparatus for a railroad vehicle capable of improving the reliability without increasing the number of power converters.

Solution to Problem

In order to solve the above problems and achieve the object, an aspect of the present invention is a propulsion control apparatus for a railroad vehicle including: a first power converter that is configured to be able to connect to a direct-current common unit, that, when a direct-current power from the direct-current common unit is input from a first input/output end side and a first motor that generates a driving power for a vehicle is driven, operates as a DC/AC converter to convert the direct-current power into an alternating-current power and outputs the alternating-current power to a second input/output end side, the second input/output end being different from the first input/output end, that, when a direct-current power from the direct-current common unit is input from the first input/output end side and a power storage device is charged, operates as a DC/DC converter to convert the direct-current power into a direct-current power and outputs the direct-current power to the second input/output end side, that, when a regenerative power from the first motor is input from the second input/output end side, operates as an AC/DC converter to convert the regenerative power into a direct-current power and outputs the direct-current power to the direct-current common unit via the first input/output end, and that, when a direct-current power from the power storage device is input from the second input/output end side, operates as a DC/DC converter and outputs a direct-current power to the first input/output end side; a second power converter that is configured to be able to connect to the direct-current common unit, that, when a direct-current power from the direct-current common unit is input from a first input/output end side, operates as a DC/AC converter to convert the direct-current power into an alternating-current power and outputs the alternating-current power to a second input/output end side, the second input/output end being different from the first input/output end, and that, when a regenerative power from a second motor is input from the second input/output end side, operates as an AC/DC converter to convert the regenerative power into a direct-current power and outputs the direct-current power to the direct-current common unit via the first input/output end; a power storage device as a direct-current power supply that is configured to be able to connect to a second input/output end side of the first power converter and that is charged with a direct-current power supplied from this second input/output end side or discharges a direct-current power to this second input/output end side; a first control device that controls an operation of the first power converter; a second control device that controls an operation of the second power converter; a first line breaker that is arranged on a power line that transmits a direct-current power to be transferred between different vehicles and that is controlled by the first control device; and a second line breaker that is arranged on the power line and is controlled by the second control device, wherein when the first control device detects that an abnormality has occurred in the direct-current common unit in accordance with a voltage value or (and) a current value detected in the direct-current common unit, the first control device controls the first line breaker such that the first line breaker is off, and when the second control device detects that an abnormality has occurred in the direct-current common unit in accordance with the voltage value or (and) the current value, the second control device controls the second line breaker such that the second line breaker is off.

Advantageous Effects of Invention

According to the present invention, because at least one of a plurality of power converters that receive power in common from the overhead line switches between the DC/AC conversion function, the AC/DC conversion function, and the DC/DC conversion function and controls a line breaker arranged in the direct-current common unit, an effect is obtained where the reliability of the propulsion control apparatus can be improved without increasing the number of power converters.

DESCRIPTION OF EMBODIMENTS

Exemplary embodiments of a propulsion control apparatus for a railroad vehicle (hereinafter, a "propulsion control apparatus") according to the present invention will be explained below in detail with reference to the drawings. This invention is not limited to the embodiments.

Embodiment

Figure 1:
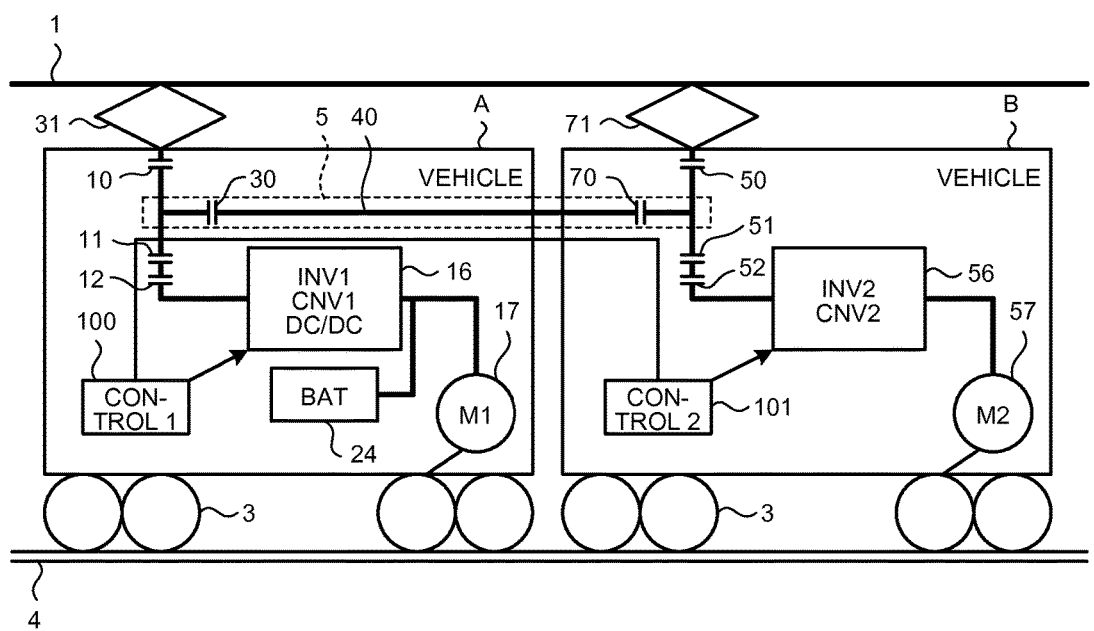
FIG. 1 is a diagram schematically illustrating railroad vehicles on which a propulsion control apparatus according to an embodiment of the present invention is mounted.
Figure 2:
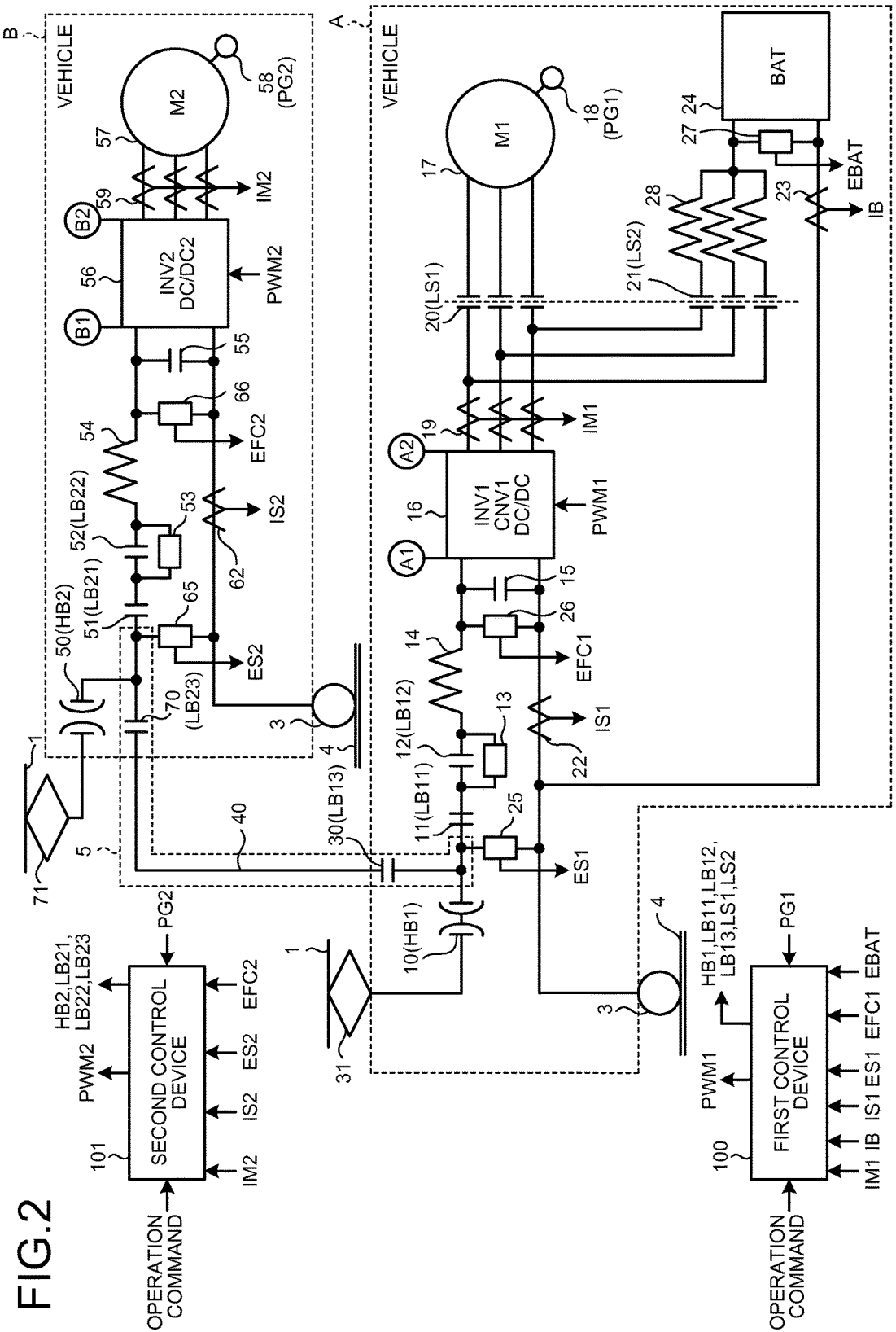
FIG. 2 is a diagram illustrating an example of the configuration of the propulsion control apparatus according to the embodiment of the present invention.

FIG. 1 is a diagram schematically illustrating railroad vehicles on which a propulsion control apparatus according to an embodiment of the present invention is mounted and FIG. 2 is a diagram illustrating an example of the configuration of the propulsion control apparatus according to the embodiment of the present invention.

FIG. 1 illustrates a train that includes vehicles A and B in an example of supplying direct-current power from an overhead line 1. A first power converter 16, a first motor 17, a power storage device 24, and a first control device 100 are mounted on the vehicle A. A second power converter 56, a second motor 57, and a second control device 101 are mounted on the vehicle B.

In the propulsion control apparatus according to the present embodiment, the direct-current power from the overhead line 1 is received via a pantograph 31 and the received direct-current power is supplied to a direct-current common unit 5 via a first high-speed circuit breaker 10. In a similar manner, the direct-current power from the overhead line 1 is received via a pantograph 71 and the received direct-current power is supplied to the direct-current common unit 5 via a second high-speed circuit breaker 50. A power line 40 is provided between the vehicle A and the vehicle B, the power line 40 forms the direct-current common unit 5, and the direct-current power to be transferred between the vehicles A and B is transmitted to the power line 40. The negative side of the direct-current common unit 5 is in contact with a rail 4 via wheels 3. The negative side of the direct-current common unit 5 may be connected in parallel with the positive side of the direct-current common unit 5. As described above, the power storage device 24, a plurality of power converters 16 and 56 that receive direct-current power from the overhead line 1, and a plurality of motors 17 and 57 are mounted on railroad vehicles. In the propulsion control apparatus according to the present embodiment, at least one of the power converters 16 and 56 is configured to be able to switch between the DC/AC conversion function, the AC/DC conversion function, and the DC/DC conversion function. In the present embodiment, an explanation will be given of a case where the first power converter 16 has these functions.

In FIG. 2, the propulsion control apparatus includes, as its main constituent devices, the first control device 100, the second control device 101, the first power converter 16, the first motor 17, the power storage device 24, the second power converter 56, the second motor 57, a first charging resistor 13, a first filter reactor 14, a first filter capacitor 15, reactors 28, a second charging resistor 53, a second filter reactor 54, and a second filter capacitor 55.

In addition to these main constituent devices, the propulsion control apparatus includes, in order to freely change the power supply path, the first high-speed circuit breaker 10, the second high-speed circuit breaker 50, a first line breaker 11, a second line breaker 12, a third line breaker 51, a fourth line breaker 52, a fifth line breaker 30, a sixth line breaker 70, first contactors 20, and second contactors 21. The first charging resistor 13 is connected in parallel with the second line breaker 12 and the second charging resistor 53 is connected in parallel with the fourth line breaker 52. The fifth line breaker 30 and the sixth line breaker 70 are provided on the power line 40.

Moreover, in addition to the above devices, the propulsion control apparatus includes a first voltage detector 25 that detects a voltage ES1 of the direct-current common unit 5, a first current detector 22 that detects a current IS1 flowing in and out of a portion between the overhead line 1 and the first power converter 16, a second voltage detector 26 that detects a voltage EFC1 of the first filter capacitor 15, second current detectors 19 that detect a current IM1 flowing into and out of the first power converter 16, a third current detector 23 that detects a battery current IB flowing into and out of the power storage device 24, a third voltage detector 27 that detects a battery voltage EBAT of the power storage device 24, a fourth voltage detector 65 that detects a voltage ES2 of the direct-current common unit 5, a fourth current detector 62 that detects a current IS2 flowing in and out of a portion between the overhead line 1 and the second power converter 56, a fifth voltage detector 66 that detects a voltage EFC2 of the second filter capacitor 55, fifth current detectors 59 that detect an alternating current IM2 flowing into and out of the fifth voltage detector 66, a first speed detector 18 that detects a rotational speed PG1 of the first motor 17, and a second speed detector 58 that detects a rotational speed PG2 of the second motor 57.

The power storage device 24 is an electric energy storage device that uses a lithium-ion battery, a nickel-metal hydride battery, an electrical double layer capacitor, a lithium-ion capacitor, a flywheel, or the like as a storage unit. The power storage device 24 is connected to the first power converter 16 via the second contactors 21 and the reactors 28 and the power storage device 24 performs charging and discharging of direct-current power.

The first power converter 16 operates as an AC/DC converter, a DC/AC converter, or a DC/DC converter. When the first power converter 16 operates as a DC/AC converter, the direct-current power from the overhead line 1 or the second power converter 56 is supplied to a first input/output end A1 of the first power converter 16 located on the direct-current common unit 5 side. This direct-current power is converted into alternating-current power in the first power converter 16 and this alternating-current power is supplied to the first motor 17. The first motor 17 is driven by this alternating-current power.

When the first power converter 16 operates as an AC/DC converter, the regenerative power from the first motor 17 is supplied to a second input/output end A2 of the first power converter 16 located on the first motor 17 side. This regenerative power is converted into direct-current power in the first power converter 16 and this direct-current power is supplied to the direct-current common unit 5.

When the first power converter 16 operates as a DC/DC converter, the direct-current power supplied to the first input/output end A1 side via the direct-current common unit 5 from the overhead line 1 or the second power converter 56 is converted into the desired direct-current power and the power storage device 24 is charged with this direct-current power.

The second power converter 56 operates as a DC/AC converter or an AC/DC converter. When the second power converter 56 operates as a DC/AC converter, the direct-current power from the overhead line 1 or the first power converter 16 is supplied to a first input/output end B1 of the second power converter 56 located on the direct-current common unit 5 side. This direct-current power is converted into alternating-current power in the second power converter 56 and this alternating-current power is supplied to the second motor 57. The second motor 57 is driven by this alternating-current power.

When the second power converter 56 operates as an AC/DC converter, the regenerative power from the second motor 57 is supplied to a second input/output end B2 of the second power converter 56 located on the second motor 57 side. This regenerative power is converted into direct-current power in the second power converter 56 and this direct-current power is supplied to the direct-current common unit 5.

The first motor 17 that has received alternating-current power from the first power converter 16 generates a propulsive force. The second motor 57 that has received alternating-current power from the second power converter 56 generates a propulsive force.

The first high-speed circuit breaker 10 is inserted between the pantograph 31 and the direct-current common unit 5. The first line breaker 11 and the second line breaker 12 are connected in series and are inserted between the direct-current common unit 5 and the first power converter 16. The second high-speed circuit breaker 50 is inserted between the pantograph 71 and the direct-current common unit 5. The third line breaker 51 and the fourth line breaker 52 are connected in series and are inserted between the direct-current common unit 5 and the second power converter 56. The first contactors 20 are inserted between the first power converter 16 and the first motor 17. The second contactors 21 are inserted between the first power converter 16 and the power storage device 24. One ends of the first contactors 20 and one ends of the second contactors 21 are connected to each other. The fifth line breaker 30 is connected to the first high-speed circuit breaker 10 at one end and is connected to the sixth line breaker 70 at the other end. The sixth line breaker 70 is connected to the fifth line breaker 30 at one end and is connected to the second high-speed circuit breaker 50 at the other end.

Among the detected values detected by the sensors, the voltage ES1, the current IS1, the voltage EFC1, the current IM1, the battery current IB, and the battery voltage EBAT are input to the first control device 100. Among the detected values detected by the sensors, the voltage ES2, the current IS2, the voltage EFC2, and the current IM2 are input to the second control device 101. Moreover, an operation command is input to the control devices 100 and 101 from their cabs (not illustrated).

The first control device 100 switches the operation mode of the vehicle A in accordance with the operation command and generates, on the basis of the detected values described above, a signal (PWM1) for controlling the switching elements (not illustrated) of the first power converter 16, a signal (HB1) for controlling on/off of the first high-speed circuit breaker 10, signals (LB11, LB12, and LB13) for controlling on/off of the line breakers, and signals (LS1 and LS2) for controlling on/off of the contactors. The generated signal group is output to each unit to be controlled. An answer back from each of these devices is input to the first control device 100.

The second control device 101 switches the operation mode of the vehicle B in accordance with the operation command and generates, on the basis of the detected values described above, a signal (PWM2) for controlling the switching elements (not illustrated) of the second power converter 56, a signal (HB2) for controlling on/off of the second high-speed circuit breaker 50, and signals (LB11, LB12, and LB13) for controlling on/off of the line breakers. The generated signal group is output to each unit to be controlled. An answer back from each of these devices is input to the second control device 101. The first control device 100 and the second control device 101 may be connected by a signal line and may be controlled by exchanging the detected values and the control amounts of each of the control devices.

Each of the control devices (100, 101) determines whether there is an abnormality in the direct-current common unit 5 in accordance with the voltage value detected by the voltage detector (25, 65) and controls the line breaker (30, 70). Each of the control devices may be configured such that it determines whether there is an abnormality in the direct-current common unit 5 in accordance with the current value detected by a current detector (not illustrated) instead of the voltage detector and controls the line breaker. An abnormality that occurs in the direct-current common unit 5 is, for example, disconnection and ground fault in the power line 40.

In FIG. 1 to FIG. 16, the first motor 17, the second motor 57, and the power storage device 24 are represented by "M1", "M2", and "BAT", respectively. The first power converter 16 and the second power converter 56 are represented by notations focusing on their respective functions. For example, when the first power converter 16 operates as an AC/DC converter, the first power converter 16 is represented by "CNV1", when the first power converter 16 operates as a DC/AC converter, the first power converter 16 is represented by "INV1", and when the first power converter 16 operates as a DC/DC converter, the first power converter 16 is represented by "DC/DC". When the second power converter 56 operates as an AC/DC converter, the second power converter 56 is represented by "CNV2", and when the second power converter 56 operates as a DC/AC converter, the second power converter 56 is represented by "INV2".

Next, an operation of the propulsion control apparatus corresponding to each operation command will be explained.

When an operation command "powering with overhead line power" is input, the first control device 100 controls the first line breaker 11 such that it is on and charges the first filter capacitor 15 via the first filter reactor 14 while limiting current with the first charging resistor 13. When the first control device 100 confirms that the first filter capacitor 15 is charged to a predetermined voltage in accordance with the voltage value detected by the second voltage detector 26, the first control device 100 turns on the second line breaker 12 to short-circuit the first charging resistor 13. Then, direct-current power is converted into alternating-current power by the first power converter 16 and the first motor 17 is driven by this alternating-current power.

In a similar manner, when an operation command "powering with overhead line power" is input, the second control device 101 controls the sixth line breaker 70 and the third line breaker 51 such that they are on and charges the second filter capacitor 55 via the second filter reactor 54 while limiting current with the second charging resistor 53. When the second control device 101 confirms that the second filter capacitor 55 is charged to a predetermined voltage in accordance with the voltage value detected by the fifth voltage detector 66, the second control device 101 turns on the fourth line breaker 52 to short-circuit the second charging resistor 53. Then, direct-current power is converted into alternating-current power by the second power converter 56 and the second motor 57 is driven by this alternating-current power.

When an operation command "brake" is input while the train is running, the first control device 100 causes the first motor 17 to operate as a generator and causes the generated alternating-current power to be converted into direct-current power in the first power converter 16. This direct-current power is returned to the overhead line 1. However, when the overhead line voltage is higher than a predetermined voltage, an air brake (not illustrated) operates and the vehicle stops.

In a similar manner, when an operation command "brake" is input while the train is running, the second control device 101 causes the second motor 57 to operate as a generator and causes the generated alternating-current power to be converted into direct-current power in the second power converter 56. This direct-current power is returned to the overhead line 1. However, when the overhead line voltage is higher than a predetermined voltage, an air brake (not illustrated) operates and the vehicle stops.

When an operation command "charging with overhead line power" is input, the first control device 100 turns on the first line breaker 11 and charges the first filter capacitor 15 via the first filter reactor 14 while limiting current with the first charging resistor 13. When the first control device 100 confirms that the first filter capacitor 15 is charged to a predetermined voltage in accordance with the voltage value detected by the second voltage detector 26, the first control device 100 turns on the second line breaker 12 to short-circuit the first charging resistor 13. Furthermore, the first control device 100 turns on the second contactors 21 and causes the first power converter 16 to convert the overhead line voltage of the overhead line 1 into the voltage of the power storage device 24. Consequently, the power storage device 24 is charged.

When an operation command "charging with all regenerative power" is input while the train is running, the second control device 101 controls the second high-speed circuit breaker 50 and the sixth line breaker 70 such that the second high-speed circuit breaker 50 is off and the sixth line breaker 70 is on, causes the second motor 57 to operate as a generator, and causes the generated alternating-current power to be converted into direct-current power in the second power converter 56. The first control device 100 turns on the fifth line breaker 30, turns off the first high-speed circuit breaker 10, turns off the first contactors 20, turns on the second contactors 21, and causes the first power converter 16 to convert the voltage from the second power converter 56 into the voltage (for example, 600 Vdc) of the power storage device 24. Consequently, the power storage device 24 is charged.

When an operation command "powering with stored power" is input, the first control device 100 turns off the first high-speed circuit breaker 10, turns on the first line breaker 11, and charges the first filter capacitor 15 via the first filter reactor 14 while limiting current with the first charging resistor 13. When the first control device 100 confirms that the first filter capacitor 15 is charged to a predetermined voltage in accordance with the voltage value detected by the second voltage detector 26, the first control device 100 turns on the second line breaker 12 to short-circuit the first charging resistor 13. Then, in the first power converter 16, the voltage of the direct-current common unit 5 is controlled such that it becomes the voltage of the power storage device 24 or a voltage close to the voltage of the power storage device 24.

Moreover, when an operation command "powering with stored power" is input, the second control device 101 controls the second high-speed circuit breaker 50, the sixth line breaker 70, and the third line breaker 51 such that the second high-speed circuit breaker 50 is off, the sixth line breaker 70 is on, the third line breaker 51 is on, and charges the second filter capacitor 55 via the second filter reactor 54 while limiting current with the second charging resistor 53. When the second control device 101 confirms that the second filter capacitor 55 is charged to a predetermined voltage in accordance with the voltage value detected by the fifth voltage detector 66, the second control device 101 turns on the fourth line breaker 52 to short-circuit the second charging resistor 53. Then, in the second power converter 56, the direct-current power from the first power converter 16 is converted into alternating-current power and the second motor 57 is driven by this alternating-current power.

Next, an explanation will be given of an operation in each mode of the propulsion control apparatus with reference to FIG. 3 to FIG. 8.

Figure 3:
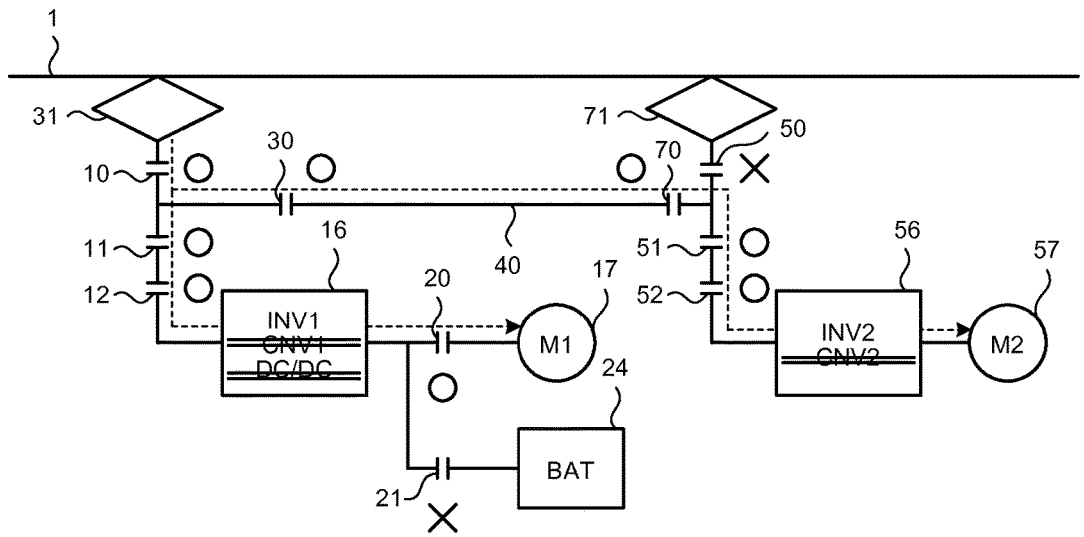
FIG. 3 is a diagram illustrating an operation when a first motor and a second motor are driven by using the power of an overhead line.

FIG. 3 is a diagram illustrating an operation when the first motor 17 and the second motor 57 are driven by using the power of the overhead line 1. When the first motor 17 and the second motor 57 are driven by using the power of the overhead line 1, control is performed such that the first high-speed circuit breaker 10 is on, the second high-speed circuit breaker 50 is off, the fifth line breaker 30 is on, the sixth line breaker 70 is on, the first line breaker 11 is on, the second line breaker 12 is on, the first contactors 20 are on, the second contactors 21 are off, the third line breaker 51 is on, and the fourth line breaker 52 is on. When controlled in this way, the first power converter 16 operates as a DC/AC converter (INV1); therefore, the direct-current power from the overhead line 1 is converted into alternating-current power and the first motor 17 is driven. Moreover, the second power converter 56 operates as a DC/AC converter (INV2); therefore, the direct-current power from the overhead line 1 is converted into alternating-current power and the second motor 57 is driven.

Figure 4:
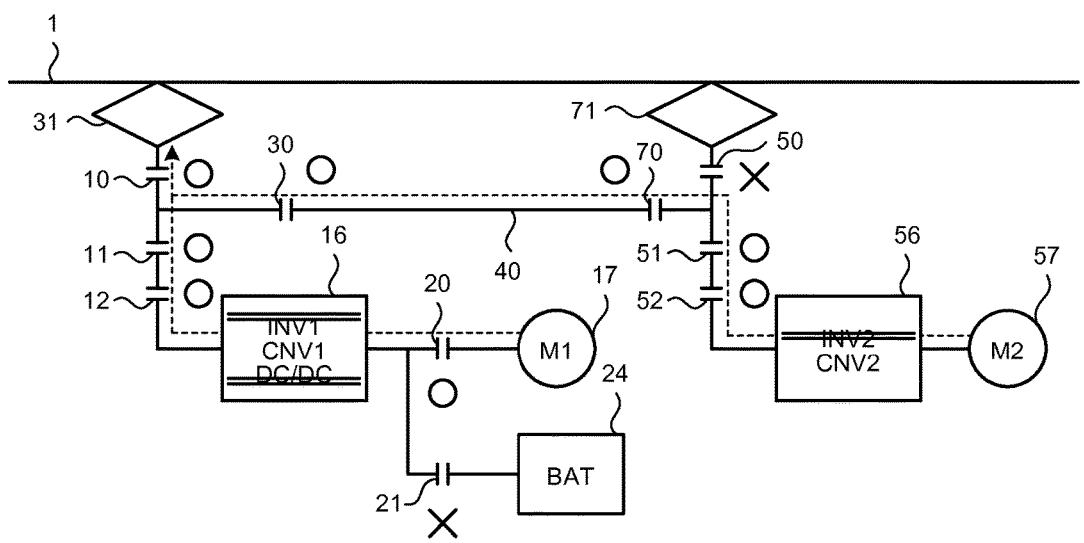
FIG. 4 is a diagram illustrating an operation when the regenerative power of the first motor and the second motor is returned to the overhead line.

FIG. 4 is a diagram illustrating an operation when the regenerative power of the first motor 17 and the second motor 57 is returned to the overhead line 1. When the regenerative power of the first motor 17 and the second motor 57 is returned to the overhead line 1, control is performed such that the first high-speed circuit breaker 10 is on, the second high-speed circuit breaker 50 is off, the fifth line breaker 30 is on, the sixth line breaker 70 is on, the first line breaker 11 is on, the second line breaker 12 is on, the first contactors 20 are on, the second contactors 21 are off, the third line breaker 51 is on, and the fourth line breaker 52 is on. When controlled in this way, the first power converter 16 operates as an AC/DC converter (CNV1); therefore, the regenerative power from the first motor 17 is converted into direct-current power and this direct-current power is returned to the overhead line 1. Moreover, the second power converter 56 operates as an AC/DC converter (CNV2); therefore, the regenerative power from the second motor 57 is converted into direct-current power and this direct-current power is returned to the overhead line 1. During this control, in order to return the regenerative power to the overhead line 1, the voltage of the direct-current common unit 5 is controlled such that it is around 1500 Vdc or a predetermined voltage that is equal to or larger than 1500 Vdc. In other words, when the control devices 100 and 101 cause the power converters 16 and 56 to operate as AC/DC converters, the control devices 100 and 101 control the output voltages of the power converters 16 and 56 such that the voltage of the direct-current common unit 5 becomes a high voltage according to the voltage of the overhead line 1.

Figure 5:
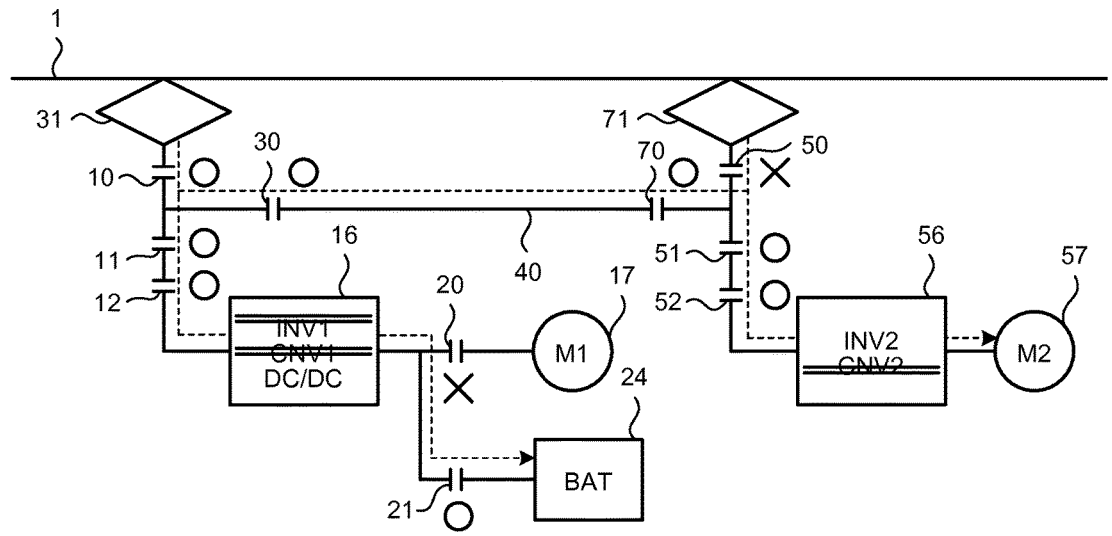
FIG. 5 is a diagram illustrating an operation when the power of the overhead line is used as driving power for the second motor and charging power for a power storage device.

FIG. 5 is a diagram illustrating an operation when the power of the overhead line 1 is used as driving power for the second motor 57 and charging power for the power storage device 24. When the power of the overhead line 1 is used as driving power for the second motor 57 and charging power for the power storage device 24, control is performed such that the first high-speed circuit breaker 10 is on, the second high-speed circuit breaker 50 is off, the fifth line breaker 30 is on, the sixth line breaker 70 is on, the first line breaker 11 is on, the second line breaker 12 is on, the first contactors 20 are off, the second contactors 21 are on, the third line breaker 51 is on, and the fourth line breaker 52 is on. When controlled in this way, the first power converter 16 operates as a DC/DC converter (DC/DC); therefore, the power storage device 24 is charged. Moreover, the second power converter 56 operates as a DC/AC converter (INV2); therefore, the direct-current power from the overhead line 1 is converted into alternating-current power and the second motor 57 is driven. During this control, in order to charge the power storage device 24 with the power of the overhead line 1, the voltage of the direct-current common unit 5 is converted into the voltage (for example, 600 Vdc) of the power storage device 24. In other words, when the direct-current power from the direct-current common unit 5 is input from the first input/output end A1 side and the first power converter 16 is caused to operate as a DC/DC converter, the first control device 100 controls the output voltage of the first power converter 16 such that the voltage on the second input/output end A2 side becomes a low voltage according to the output voltage of the power storage device 24.

Figure 6:
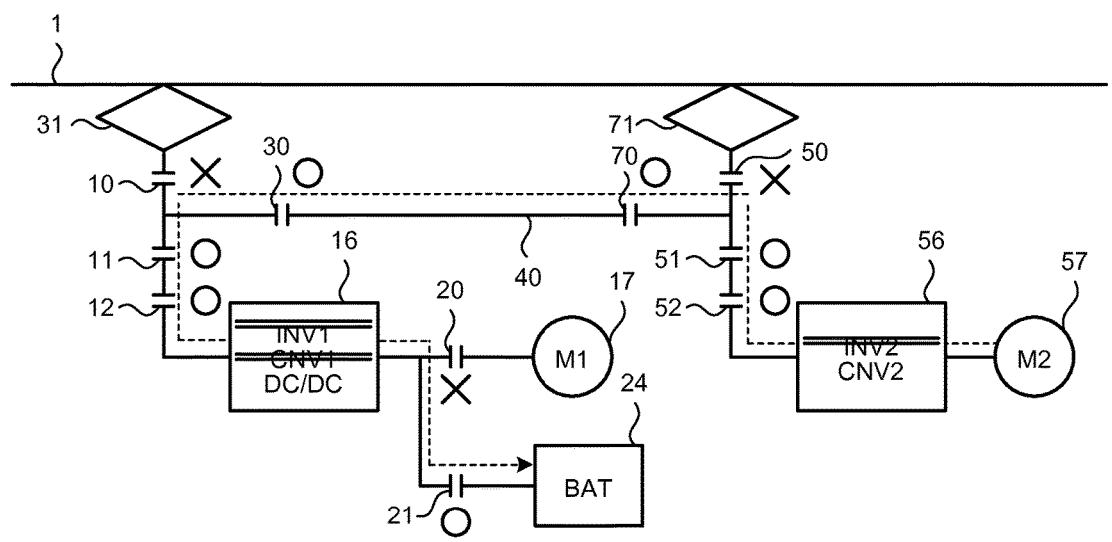
FIG. 6 is a diagram illustrating an operation when all the regenerative power of the second motor is used as charging power for the power storage device.

FIG. 6 is a diagram illustrating an operation when all the regenerative power of the second motor 57 is used as charging power for the power storage device 24. When all the regenerative power of the second motor 57 is used as charging power for the power storage device 24, control is performed such that the first high-speed circuit breaker 10 is off, the second high-speed circuit breaker 50 is off, the fifth line breaker 30 is on, the sixth line breaker 70 is on, the first line breaker 11 is on, the second line breaker 12 is on, the first contactors 20 are off, the second contactors 21 are on, the third line breaker 51 is on, and the fourth line breaker 52 is on. When controlled in this way, the second power converter 56 operates as an AC/DC converter (CNV2); therefore, the regenerative power from the second motor 57 is converted into direct-current power and this direct-current power is supplied to the first power converter 16. Then, the first power converter 16 operates as a DC/DC converter (DC/DC); therefore, the power storage device 24 is charged.

Figure 7:
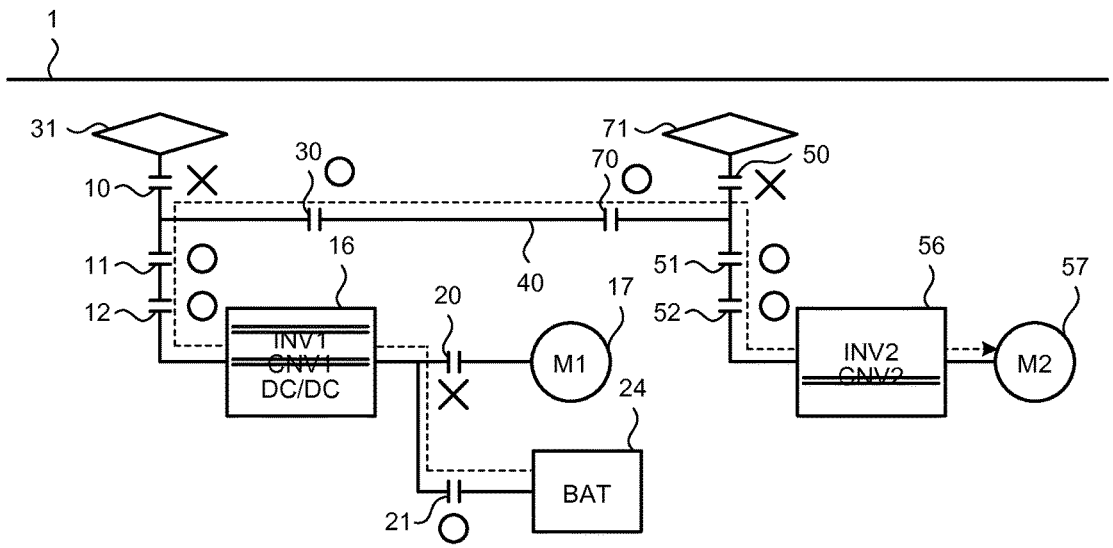
FIG. 7 is a diagram illustrating an operation when the second motor is driven by using only the stored power of the power storage device in a case where, for example, an overhead line power failure has occurred.

FIG. 7 is a diagram illustrating an operation when the second motor 57 is driven by using only the stored power of the power storage device 24 in a case where, for example, an overhead line power failure has occurred. An overhead line power failure indicates a state where although the overhead line 1 is normal, power is not supplied because of an abnormality with the power source (such as a substation). When the second motor 57 is driven by using only the stored power of the power storage device 24, control is performed such that the first high-speed circuit breaker 10 is off, the second high-speed circuit breaker 50 is off, the fifth line breaker 30 is on, the sixth line breaker 70 is on, the first line breaker 11 is on, the second line breaker 12 is on, the first contactors 20 are off, the second contactors 21 are on, the third line breaker 51 is on, and the fourth line breaker 52 is on. When controlled in this way, the first power converter 16 operates as a DC/DC converter (DC/DC); therefore, the power of the power storage device 24 is supplied to the second power converter 56. Then, the second power converter 56 operates as a DC/AC converter (INV2); therefore, the second motor 57 is driven. During this control, the power from the power storage device 24 is converted into the voltage of the direct-current common unit 5. In other words, when the direct-current power from the power storage device 24 is input from the second input/output end A2 side and the first power converter 16 is caused to operate as a DC/DC converter, the first control device 100 controls the output voltage of the first power converter 16 such that the voltage of the direct-current common unit 5 becomes a high voltage according to the overhead line voltage.

Figure 8:
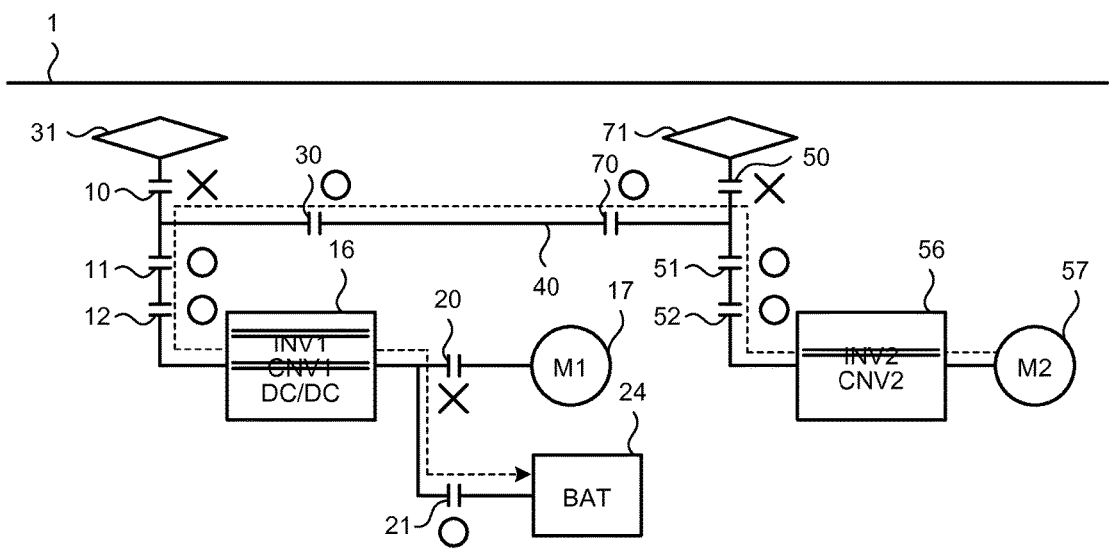
FIG. 8 is a diagram illustrating an operation when all the regenerative power of the second motor is used as charging power for the power storage device in a case where, for example, an overhead line power failure has occurred.

FIG. 8 is a diagram illustrating an operation when all the regenerative power of the second motor 57 is used as charging power for the power storage device 24 in a case where, for example, an overhead line power failure has occurred. When all the regenerative power of the second motor 57 is used as charging power for the power storage device 24, control is performed such that the first high-speed circuit breaker 10 is off, the second high-speed circuit breaker 50 is off, the fifth line breaker 30 is on, the sixth line breaker 70 is on, the first line breaker 11 is on, the second line breaker 12 is on, the first contactors 20 are off, the second contactors 21 are on, the third line breaker 51 is on, and the fourth line breaker 52 is on. When controlled in this way, the second power converter 56 operates as an AC/DC converter (CNV2); therefore, the direct-current power from the second power converter 56 is supplied to the first power converter 16. Then, the first power converter 16 operates as a DC/DC converter (DC/DC); therefore, the power storage device 24 is charged.

Next, an explanation will be given of an operation in each mode of the propulsion control apparatus when an abnormality has occurred in the direct-current common unit 5 with reference to FIG. 9 to FIG. 14.

Figure 9:
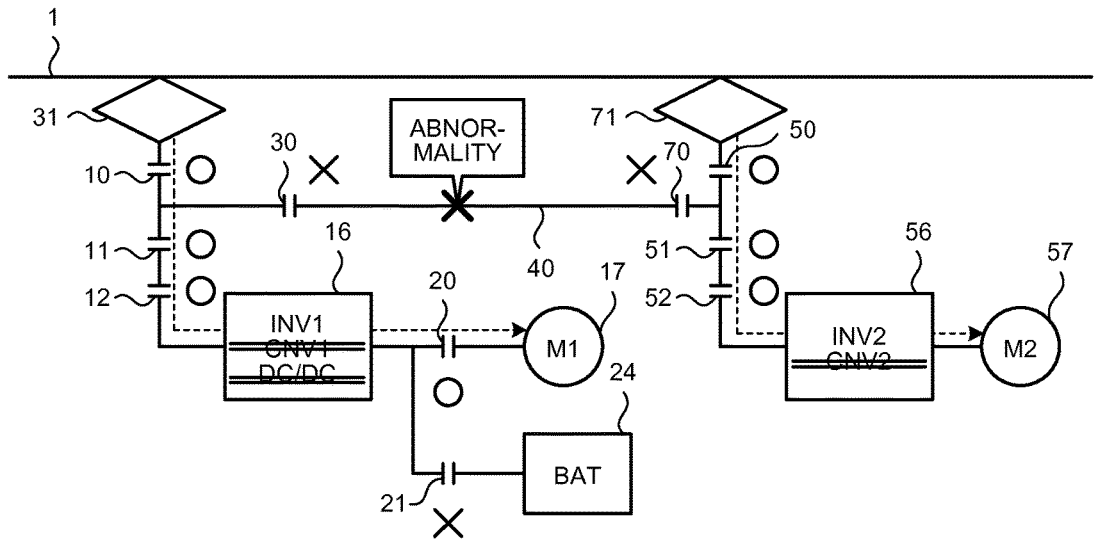
FIG. 9 is a diagram illustrating an operation when the first motor and the second motor are driven by using the power of the overhead line in a case where an abnormality has occurred in a direct-current common unit.

FIG. 9 is a diagram illustrating an operation when the first motor 17 and the second motor 57 are driven by using the power of the overhead line 1 in a case where an abnormality has occurred in the direct-current common unit. When the first motor 17 and the second motor 57 are driven by using the power of the overhead line 1, control is performed such that the first high-speed circuit breaker 10 is on, the second high-speed circuit breaker 50 is on, the fifth line breaker 30 is off, the sixth line breaker 70 is off, the first line breaker 11 is on, the second line breaker 12 is on, the first contactors 20 are on, the second contactors 21 are off, the third line breaker 51 is on, and the fourth line breaker 52 is on. When controlled in this way, the first power converter 16 operates as a DC/AC converter (INV1); therefore, the direct-current power from the overhead line 1 is converted into alternating-current power and the first motor 17 is driven. Moreover, the second power converter 56 operates as a DC/AC converter (INV2); therefore, the direct-current power from the overhead line 1 is converted into alternating-current power and the second motor 57 is driven.

Figure 10:
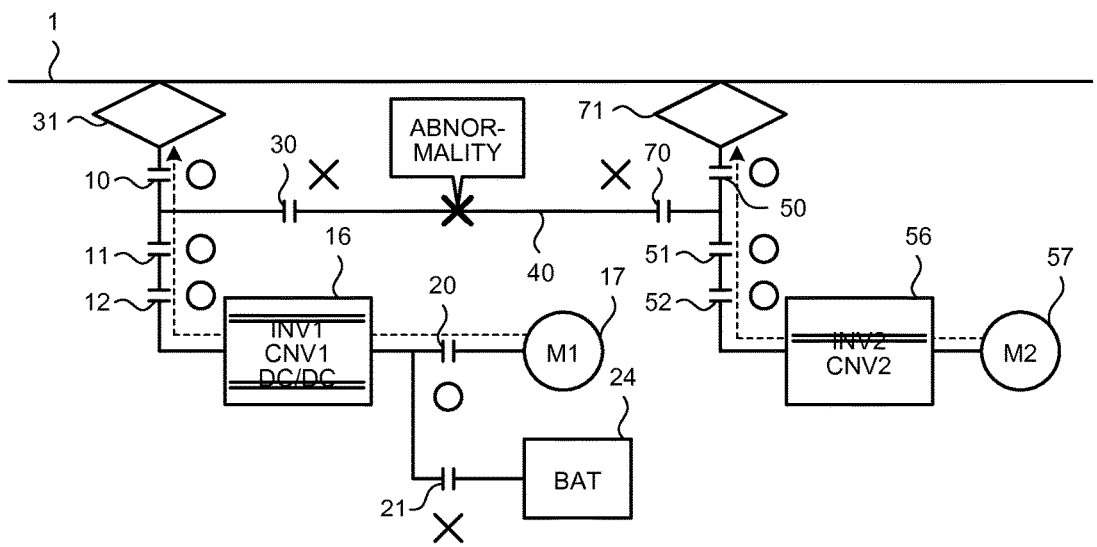
FIG. 10 is a diagram illustrating an operation when the regenerative power of the first motor and the second motor is returned to the overhead line in a case where an abnormality has occurred in the direct-current common unit.

FIG. 10 is a diagram illustrating an operation when the regenerative power of the first motor 17 and the second motor 57 is returned to the overhead line 1 in a case where an abnormality has occurred in the direct-current common unit. When the regenerative power of the first motor 17 and the second motor 57 is returned to the overhead line 1, control is performed such that the first high-speed circuit breaker 10 is on, the second high-speed circuit breaker 50 is on, the fifth line breaker 30 is off, the sixth line breaker 70 is off, the first line breaker 11 is on, the second line breaker 12 is on, the first contactors 20 are on, the second contactors 21 are off, the third line breaker 51 is on, and the fourth line breaker 52 is on. When controlled in this way, the first power converter 16 operates as an AC/DC converter (CNV1); therefore, the regenerative power from the first motor 17 is converted into direct-current power and this direct-current power is returned to the overhead line 1. Moreover, the second power converter 56 operates as an AC/DC converter (CNV2); therefore, the regenerative power from the second motor 57 is converted into direct-current power and this direct-current power is returned to the overhead line 1. During this control, in order to return the regenerative power to the overhead line 1, the voltage of the direct-current common unit 5 is controlled such that it is a voltage (for example, 1500 Vdc) around the overhead line voltage. In other words, when the control devices 100 and 101 cause the power converters 16 and 56 to operate as AC/DC converters, the control devices 100 and 101 control the output voltages of the power converters 16 and 56 such that the voltage of the direct-current common unit 5 becomes a high voltage according to the voltage of the overhead line 1.

Figure 11:
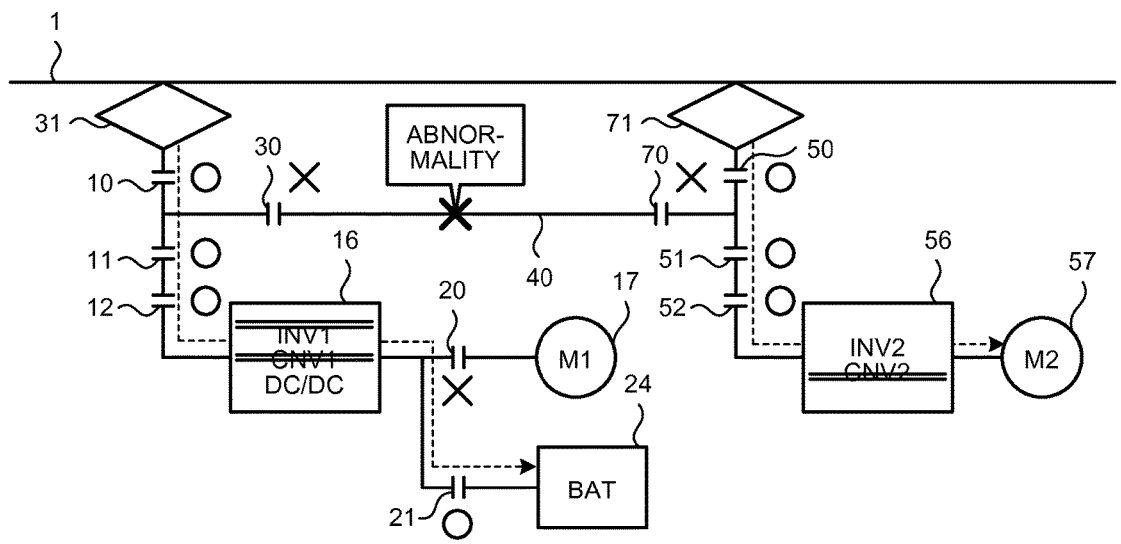
FIG. 11 is a diagram illustrating an operation when the power of the overhead line is used as driving power for the second motor and charging power for the power storage device in a case where an abnormality has occurred in the direct-current common unit.

FIG. 11 is a diagram illustrating an operation when the power of the overhead line 1 is used as driving power for the second motor 57 and charging power for the power storage device 24 in a case where an abnormality has occurred in the direct-current common unit. When the power of the overhead line 1 is used as driving power for the second motor 57 and charging power for the power storage device 24, control is performed such that the first high-speed circuit breaker 10 is on, the second high-speed circuit breaker 50 is on, the fifth line breaker 30 is off, the sixth line breaker 70 is off, the first line breaker 11 is on, the second line breaker 12 is on, the first contactors 20 are off, the second contactors 21 are on, the third line breaker 51 is on, and the fourth line breaker 52 is on. When controlled in this way, the first power converter 16 operates as a DC/DC converter (DC/DC); therefore, the power storage device 24 is charged. Moreover, the second power converter 56 operates as a DC/AC converter (INV2); therefore, the direct-current power from the overhead line 1 is converted into alternating-current power and the second motor 57 is driven. During this control, in order to charge the power storage device 24 with the regenerative power, the voltage of the direct-current common unit 5 is converted into the voltage (for example, 600 Vdc) of the power storage device 24. In other words, when the direct-current power from the direct-current common unit 5 is input from the first input/output end A1 side and the first power converter 16 is caused to operate as a DC/DC converter, the first control device 100 controls the output voltage of the first power converter 16 such that the voltage on the second input/output end A2 side becomes a low voltage according to the output voltage of the power storage device 24.

Figure 12:
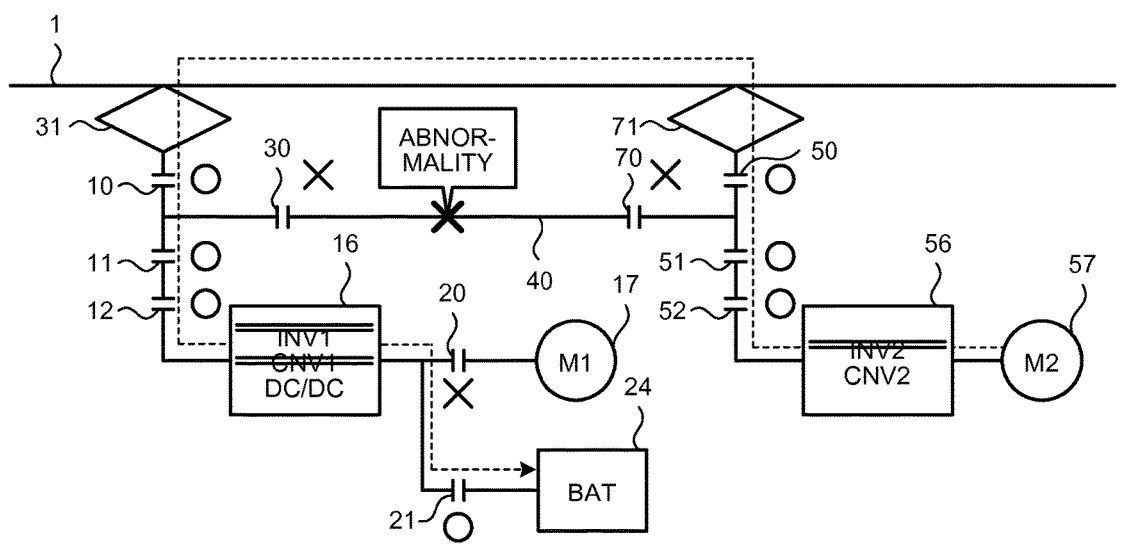
FIG. 12 is a diagram illustrating an operation when the regenerative power of the second motor is used as charging power for the power storage device in a case where an abnormality has occurred in the direct-current common unit.

FIG. 12 is a diagram illustrating an operation when all the regenerative power of the second motor 57 is used as charging power for the power storage device 24 in a case where an abnormality has occurred in the direct-current common unit. When all the regenerative power of the second motor 57 is used as charging power for the power storage device 24, control is performed such that the first high-speed circuit breaker 10 is on, the second high-speed circuit breaker 50 is on, the fifth line breaker 30 is off, the sixth line breaker 70 is off, the first line breaker 11 is on, the second line breaker 12 is on, the first contactors 20 are off, the second contactors 21 are on, the third line breaker 51 is on, and the fourth line breaker 52 is on. When controlled in this way, the second power converter 56 operates as an AC/DC converter (CNV2); therefore, the regenerative power from the second motor 57 is converted into direct-current power and this direct-current power is supplied to the first power converter 16. Then, the first power converter 16 operates as a DC/DC converter (DC/DC); therefore, the power storage device 24 is charged.

Figure 13:
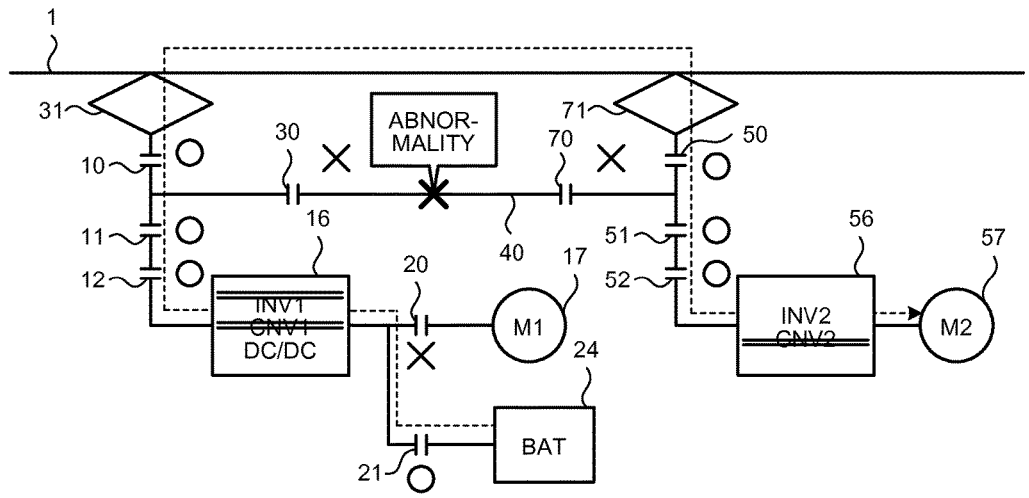
FIG. 13 is a diagram illustrating an operation when the second motor is driven by using only the stored power of the power storage device in a case where, for example, an overhead line power failure has occurred (the overhead line itself is normal) when an abnormality occurs in the direct-current common unit.

FIG. 13 is a diagram illustrating an operation when the second motor 57 is driven by using only the stored power of the power storage device 24 in a case where, for example, an overhead line power failure has occurred (the overhead line itself is normal) when an abnormality occurs in the direct-current common unit. When the second motor 57 is driven by using only the stored power of the power storage device 24, control is performed such that the first high-speed circuit breaker 10 is on, the second high-speed circuit breaker 50 is on, the fifth line breaker 30 is off, the sixth line breaker 70 is off, the first line breaker 11 is on, the second line breaker 12 is on, the first contactors 20 are off, the second contactors 21 are on, the third line breaker 51 is on, and the fourth line breaker 52 is on. When controlled in this way, the first input/output end A1 side of the first power converter 16 is connected to the overhead line 1 and the first power converter 16 operates as a DC/DC converter (DC/DC); therefore, the power of the power storage device 24 is supplied to the second power converter 56. Then, the second power converter 56 operates as a DC/AC converter (INV2); therefore, the second motor 57 is driven. During this control, the power from the power storage device 24 is converted into the voltage of the direct-current common unit 5. In other words, when the direct-current power from the power storage device 24 is input from the second input/output end A2 side and the first power converter 16 is caused to operate as a DC/DC converter, the first control device 100 controls the output voltage of the first power converter 16 such that the voltage of the direct-current common unit 5 becomes a high voltage according to the overhead line voltage.

Figure 14:
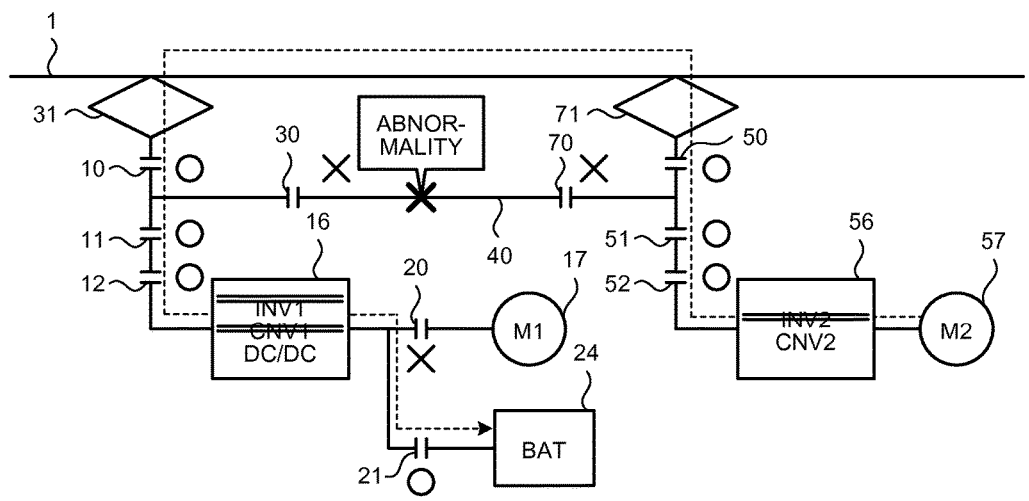
FIG. 14 is a diagram illustrating an operation when the regenerative power of the second motor is used as charging power for the power storage device in a case where, for example, an overhead line power failure has occurred (the overhead line itself is normal) when an abnormality occurs in the direct-current common unit.

FIG. 14 is a diagram illustrating an operation when all the regenerative power of the second motor 57 is used as charging power for the power storage device 24 in a case where, for example, an overhead line power failure has occurred (the overhead line itself is normal) when an abnormality occurs in the direct-current common unit. When all the regenerative power of the second motor 57 is used as charging power for the power storage device 24, control is performed such that the first high-speed circuit breaker 10 is on, the second high-speed circuit breaker 50 is on, the fifth line breaker 30 is off, the sixth line breaker 70 is off, the first line breaker 11 is on, the second line breaker 12 is on, the first contactors 20 are off, the second contactors 21 are on, the third line breaker 51 is on, and the fourth line breaker 52 is on. When controlled in this way, the first input/output end A1 side of the first power converter 16 is connected to the overhead line 1 and the second power converter 56 operates as an AC/DC converter (CNV2); therefore, the alternating-current power from the second power converter 56 is supplied to the first power converter 16. Then, the first power converter 16 operates as a DC/DC converter (DC/DC); therefore, the power storage device 24 is charged.

In the conventional technologies, the direct-current common unit 5 is not provided with a line breaker; therefore, when an abnormality has occurred in the direct-current common unit 5, this affects the devices connected to the direct-current common unit 5 and thus the reliability may decrease. Meanwhile, on non-main lines in which the number of operating trains is low, the regenerative load becomes insufficient; therefore, the regenerative power is consumed in resistors or is wasted as heat by an air brake due to regeneration cancellation. If the regenerative power can be used as charging power for a power storage device in one train, the regenerative power can be effectively used; however, with the conventional technologies, because the direct-current common unit 5 is not provided with a line breaker, when an abnormality has occurred in the direct-current common unit 5, the regenerative power from a motor of one vehicle cannot be used as charging power for a power storage device of another vehicle.

The propulsion control apparatus according to the present embodiment is configured such that the line breakers (30, 70) provided in the direct-current common unit 5 are controlled. Therefore, with the propulsion control apparatus according to the present embodiment, even when an abnormality has occurred in the direct-current common unit 5, a fault can be prevented from occurring in the devices connected to the direct-current common unit 5. Moreover, the regenerative power from a motor of one vehicle can be used as charging power for a power storage device of another vehicle.

The propulsion control apparatus according to the present embodiment may be configured by using a plurality of the power storage devices 24 and an example of the configuration is explained below.

Figure 15:
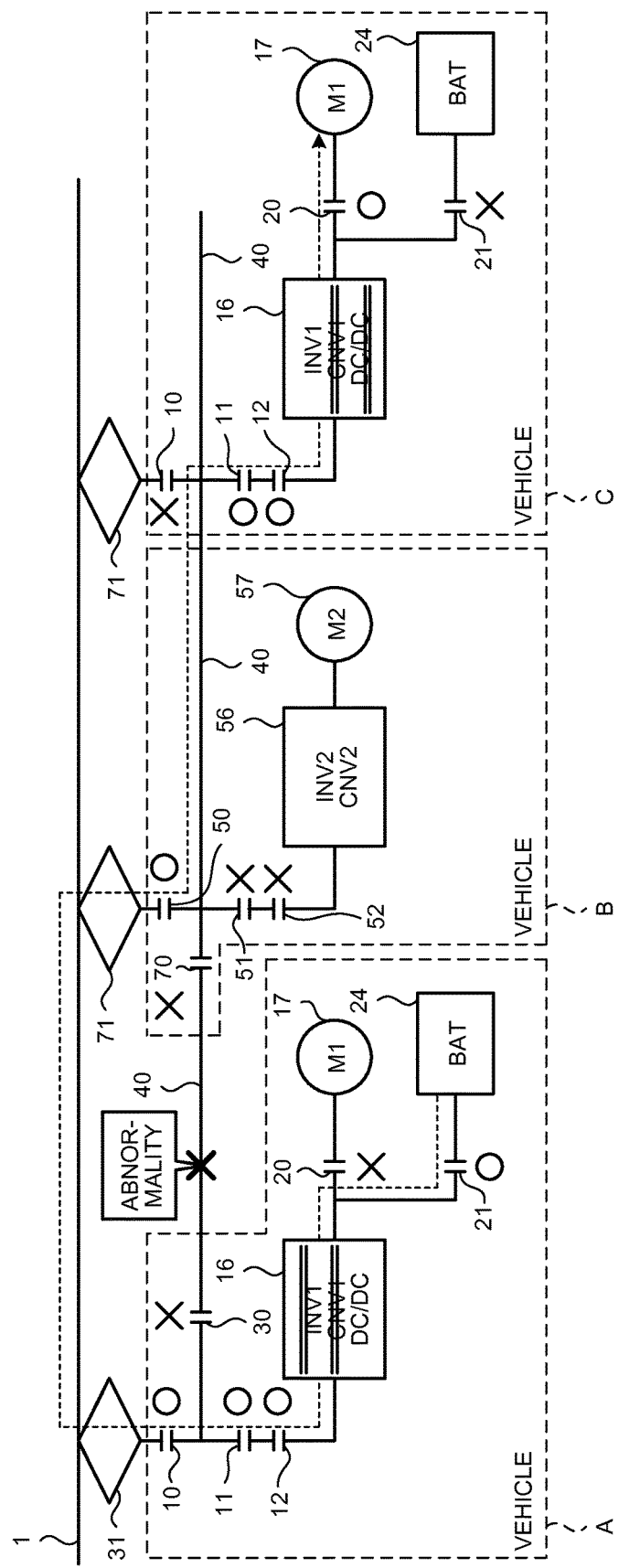
FIG. 15 is a diagram illustrating an operation when the power of the power storage device mounted on one vehicle is used as driving power for the first motor mounted on another vehicle when an abnormality has occurred in the direct-current common unit in a train on which a plurality of the power storage devices are mounted.

FIG. 15 is a diagram illustrating an operation when the power of the power storage device 24 mounted on one vehicle is used as driving power for the first motor 17 mounted on another vehicle when an abnormality has occurred in the direct-current common unit 5 in a train on which a plurality of the power storage devices 24 are mounted. FIG. 15 illustrates a train that includes vehicles A, B, and C in an example of supplying direct-current power from the overhead line 1 and in which devices similar to those mounted on the vehicle A are mounted on the vehicle C. In the example illustrated in FIG. 15, a case is assumed where an abnormality has occurred in the direct-current common unit 5 that crosses between the vehicle A and the vehicle B.

When the power of the power storage device 24 in the vehicle A is used as driving power for the first motor 17 in the vehicle C, in the vehicle A, control is performed such that the first high-speed circuit breaker 10 is on, the fifth line breaker 30 is off, the first line breaker 11 is on, the second line breaker 12 is on, the first contactors 20 are off, and the second contactors 21 are on. In the vehicle B, control is performed such that the second high-speed circuit breaker 50 is on, the sixth line breaker 70 is off, the third line breaker 51 is off, and the fourth line breaker 52 is off. In the vehicle C, control is performed such that the first high-speed circuit breaker 10 is off, the first line breaker 11 is on, the second line breaker 12 is on, the first contactors 20 are on, and the second contactors 21 are off.

When controlled in this way, the first power converter 16 in the vehicle A operates as a DC/DC converter (DC/DC); therefore, the power of the power storage device 24 in the vehicle A is supplied to the first power converter 16 in the vehicle C. Then, the first power converter 16 in the vehicle C operates as a DC/AC converter (INV1); therefore, the first motor 17 in the vehicle C is driven.

Figure 16:
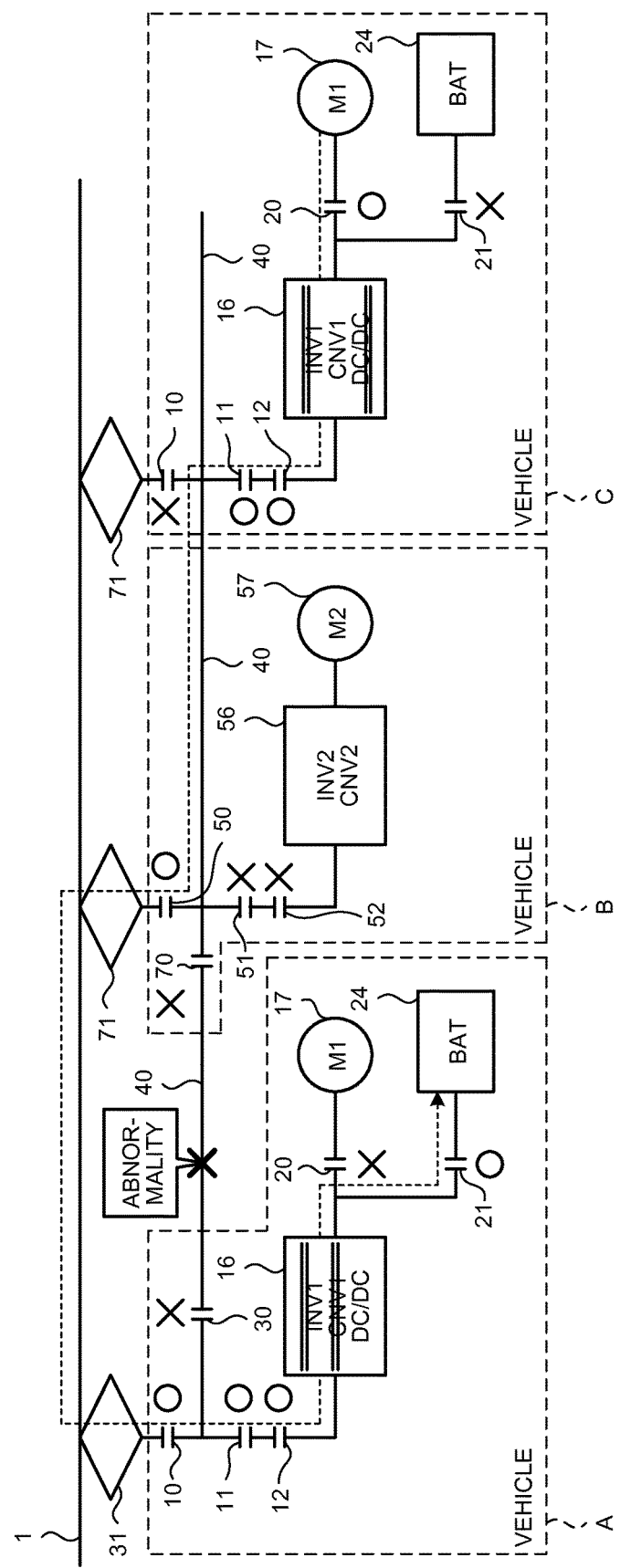
FIG. 16 is a diagram illustrating an operation when the regenerative power of the first motor mounted on another vehicle is used as charging power for the power storage device mounted on one vehicle when an abnormality has occurred in the direct-current common unit in a train on which a plurality of the power storage devices are mounted.

FIG. 16 is a diagram illustrating an operation when the regenerative power of the first motor 17 mounted on another vehicle is used as charging power for the power storage device 24 mounted on one vehicle when an abnormality has occurred in the direct-current common unit 5 in a train on which a plurality of the power storage devices 24 are mounted. FIG. 16 illustrates a train that includes the vehicles A, B, and C in a similar manner to that in FIG. 15. In the example in FIG. 16, an abnormality has occurred in the direct-current common unit 5 that crosses between the vehicle A and the vehicle B.

When the regenerative power of the first motor 17 in the vehicle C is used as charging power for the power storage device 24 in the vehicle A, in the vehicle C, control is performed such that the first high-speed circuit breaker 10 is off, the first line breaker 11 is on, the second line breaker 12 is on, the first contactors 20 are on, and the second contactors 21 are off. In the vehicle B, control is performed such that the second high-speed circuit breaker 50 is on, the sixth line breaker 70 is off, the third line breaker 51 is off, and the fourth line breaker 52 is off. In the vehicle A, control is performed such that the first high-speed circuit breaker 10 is on, the fifth line breaker 30 is off, the first line breaker 11 is on, the second line breaker 12 is on, the first contactors 20 are off, and the second contactors 21 are on.

When controlled in this way, the first power converter 16 in the vehicle C operates as an AC/DC converter (CNV1); therefore, the regenerative power from the first motor 17 in the vehicle C is converted into direct-current power and this direct-current power is supplied to the first power converter 16 in the vehicle A. Then, the first power converter 16 in the vehicle A operates as a DC/DC converter (DC/DC); therefore, the power storage device 24 in the vehicle A is charged.

The propulsion control apparatuses illustrated in FIG. 15 and FIG. 16 are configured such that control is performed such that the second high-speed circuit breaker 50 in the vehicle B is on and the first high-speed circuit breaker 10 in the vehicle C is off; however, the propulsion control apparatuses may be configured such that control is performed such that the second high-speed circuit breaker 50 in the vehicle B is off and the first high-speed circuit breaker 10 in the vehicle C is on. Moreover, the number of power storage devices is not limited to that illustrated in FIG. 1 to FIG. 16. Moreover, the number of line breakers arranged in the direct-current common unit 5 is not limited to two and may be one.

As described above, the propulsion control apparatus according to the present embodiment includes: the power converter (16) that is configured to be able to connect to the direct-current common unit 5, that, when direct-current power from the direct-current common unit 5 is input from the first input/output end A1 side and the motor that generates driving power for a vehicle is driven, operates as a DC/AC converter to convert the direct-current power into alternating-current power and outputs the alternating-current power to the side of the second input/output end A2, which is different from the first input/output end A1, that, when direct-current power from the direct-current common unit 5 is input from the first input/output end A1 side and the power storage device 24 is charged, operates as a DC/DC converter to convert the direct-current power into direct-current power and outputs the direct-current power to the second input/output end A2 side, that, when regenerative power from the motor (17) is input from the second input/output end A2 side, operates as an AC/DC converter to convert the regenerative power into direct-current power and outputs the direct-current power to the direct-current common unit 5 via the first input/output end A1, and that, when direct-current power from the power storage device 24 is input from the second input/output end A2 side, operates as a DC/DC converter and outputs direct-current power to the first input/output end A1 side; the line breaker (30) that is arranged in the direct-current common unit 5; and the control device (100) that is configured to be able to connect to the second input/output end A2 side and controls operations of the power converter (16) and the power storage device 24, wherein the power storage device 24 is configured to be able to connect to the second input/output end A2 side and functions as a direct-current power supply that is charged with direct-current power supplied from the second input/output end A2 side or discharges direct-current power to the second input/output end A2 side, and, when the control device detects an abnormality in the direct-current common unit in accordance with a voltage value or (and) a current value detected in the direct-current common unit, the control device controls the line breaker such that the line breaker is off. With the conventional technologies, it is necessary to provide a power conversion device that converts high-voltage direct-current power from the overhead line into alternating-current power to drive the motors and a power conversion device for charging/discharging the power storage device; therefore, there is a problem in that the cost increases and the size and mass of the apparatus increase. In the propulsion control apparatus according to the present embodiment, the first power converter 16 is configured to switch between the DC/AC conversion function, the AC/DC conversion function, and the DC/DC conversion function. Therefore, according to the propulsion control apparatus of the present embodiment, the number of power converters does not increase unlike the case with the conventional technologies. As a result, the cost can be reduced and the size of the apparatus can be reduced compared with the conventional technologies. Moreover, according to the propulsion control apparatus of the present embodiment, even when an abnormality has occurred in the direct-current common unit 5, a fault can be prevented from occurring in the devices connected to the direct-current common unit 5. Moreover, the regenerative power from a motor of one vehicle can be used as charging power for a power storage device of another vehicle. Furthermore, the power of a power storage device of one vehicle can be used as driving power for a motor of another vehicle.

Moreover, the propulsion control apparatus according to the present embodiment includes: the first power converter 16; the second power converter 56 that is configured to be able to connect to the direct-current common unit 5, that, when direct-current power from the direct-current common unit 5 is input from the first input/output end B1 side, operates as a DC/AC converter to convert the direct-current power into alternating-current power and outputs the alternating-current power to the side of the second input/output end B2, which is different from the first input/output end B1, and that, when regenerative power from the second motor 57 is input from the second input/output end B2 side, operates as an AC/DC converter to convert the regenerative power into direct-current power and outputs the direct-current power to the direct-current common unit 5 via the first input/output end B1; the power storage device 24; the first control device 100 that controls an operation of the first power converter 16; the second control device 101 that controls an operation of the second power converter 56; the first line breaker (the fifth line breaker 30) that is arranged in the direct-current common unit 5 and is controlled by the first control device 100; and the second line breaker (the sixth line breaker 70) that is arranged in the direct-current common unit 5 and is controlled by the second control device 101, wherein when the first control device 100 detects an abnormality in the direct-current common unit 5 in accordance with a voltage value or (and) a current value detected in the direct-current common unit 5, the first control device 100 controls the fifth line breaker 30 such that the first line breaker 30 is off, and, when the second control device 101 detects an abnormality in the direct-current common unit 5 in accordance with the voltage value or (and) the current value, the second control device 101 controls the sixth line breaker 70 such that the sixth line breaker 70 is off. As described above, by using both the first power converter 16 and the second power converter 56, the cost can be reduced and the size of the apparatus can be reduced compared with the conventional technologies and the second motor 57 can be driven by the power of the power storage device 24. Moreover, the power storage device 24 can be charged with the regenerative power from the second motor 57.

The propulsion control apparatuses for a railroad vehicle illustrated in the present embodiment are examples of the content of the present invention and it is obvious that they can be combined with other publicly known technologies and can be changed, for example, by omitting a part thereof without departing from the scope of the present invention.

INDUSTRIAL APPLICABILITY

As described above, the present invention can be applied to a propulsion control apparatus and is particularly useful as an invention that does not increase the number of power converters.

REFERENCE SIGNS LIST 1 overhead line, 3 wheel, 4 rail, 5 direct-current common unit, 10 first high-speed circuit breaker, first line breaker, 12 second line breaker, 13 first charging resistor, 14 first filter reactor, 15 first filter capacitor, 16 first power converter, 17 first motor, 18 first speed detector, 19 second current detector, 20 first contactor, 21 second contactor, 22 first current detector, 23 third current detector, 24 power storage device, 25 first voltage detector, 26 second voltage detector, 27 third voltage detector, 28 reactor, 30 fifth line breaker, 31 pantograph, 40 power line, 50 second high-speed circuit breaker, 51 third line breaker, 52 fourth line breaker, 53 second charging resistor, 54 second filter reactor, 55 second filter capacitor, 56 second power converter, 57 second motor, 58 second speed detector, 59 fifth current detector, 62 fourth current detector, 65 fourth voltage detector, 66 fifth voltage detector, 70 sixth line breaker, 71 pantograph, 100 first control device, 101 second control device, A1, B1 first input/output end, A2, B2 second input/output end.

The invention claimed is:

1. A propulsion control apparatus for a railroad vehicle system, the railroad vehicle system having at least two vehicles connected via a power line, comprising:
a first power converter to which a direct-current power from a direct-current common unit is input from a first input/output end side and which supplies, via a second input/output end side, an alternating-current power for driving a first motor that generates a driving power for the railroad vehicle system;
a second power converter to which a direct-current power from the direct-current common unit is input and which supplies an alternating-current power for driving a second motor that generates a driving power for the railroad vehicle system;
a power storage device that is configured to be able to connect to the second input/output end side of the first power converter and that is charged with a direct-current power supplied from the second input/output end side or discharges a direct-current power to the second input/output end side;
a first control device that controls an operation of the first power converter;
a second control device that controls an operation of the second power converter;
a first line breaker that is arranged on the power line that transmits a direct-current power to be transferred between different vehicles of the railroad vehicle system and that is controlled by the first control device; and
a second line breaker that is arranged on the power line and is controlled by the second control device, wherein
when an occurrence of an abnormality in the direct-current common unit is detected in accordance with a voltage value and/or a current value detected in the direct-current common unit, the first control device controls the first line breaker such that the first line breaker is off, causes the first input/output end side of the first power converter to be connected to an overhead line, and causes the first power converter to operate as a DC/DC converter to thereby allow power of the power storage device to be supplied to the second power converter, and
the second control device controls the second line breaker such that the second line breaker is off, causes the second power converter to be connected to the overhead line, and causes the second power converter to operate as a DC/AC converter to thereby allow power from the first power converter to be supplied to the second motor.

2. A propulsion control apparatus for a railroad vehicle system, the railroad vehicle system having at least two vehicles connected via a power line, comprising:
a first power converter to which a direct-current power from a direct-current common unit is input from a first input/output end side and which supplies, via a second input/output end side, an alternating-current power for driving a first motor that generates a driving power for the railroad vehicle system;
a second power converter to which a direct-current power from the direct-current common unit is input and which supplies an alternating-current power for driving a second motor that generates a driving power for the railroad vehicle system;
a power storage device that is configured to be able to connect to the second input/output end side of the first power converter and that is charged with a direct-current power supplied from the second input/output end side or discharges a direct-current power to the second input/output end side;
a first control device that controls an operation of the first power converter;
a second control device that controls an operation of the second power converter;
a first line breaker that is arranged on the power line that transmits a direct-current power to be transferred between different vehicles of the railroad vehicle system and that is controlled by the first control device; and
a second line breaker that is arranged on the power line and is controlled by the second control device, wherein
when an occurrence of an abnormality in the direct-current common unit is detected in accordance with a voltage value and/or a current value detected in the direct-current common unit, the second control device controls the second line breaker such that the second line breaker is off, causes the second power converter to be connected to an overhead line, and causes the second power converter to operate as an AC/DC converter to thereby allow regenerative power from the second motor to be supplied to the first power converter, and, the first control device controls the first line breaker such that the first line breaker is off, causes the first input/output end side of the first power converter to be connected to the overhead line, and causes the first power converter to operate as a DC/DC converter to thereby allow the power storage device to be charged with power from the second power converter.

3. A propulsion control apparatus for a railroad vehicle system, the railroad vehicle system having at least two vehicles connected via a power line, comprising:
a first power converter to which a direct-current power from a direct-current common unit is input from a first input/output end side and which supplies, via a second input/output end side, an alternating-current power for driving a first motor that generates a driving power for the railroad vehicle system;

a second power converter to which a direct-current power from the direct-current common unit is input from a first input/output end side and which supplies, via a second input/output end side, an alternating-current power for driving a second motor that generates a driving power for the railroad vehicle system;

a first power storage device that is configured to be able to connect to the second input/output end side of the first power converter and that is charged with a direct-current power supplied from the second input/output end side of the first power converter or discharges a direct-current power to the second input/output end side of the first power converter;

a second power storage device that is configured to be able to connect to the second input/output end side of the second power converter and that is charged with a direct-current power supplied from the second input/output end side of the second power converter or discharges a direct-current power to the second input/output end side of the second power converter;

a first control device that controls an operation of the first power converter;

a second control device that controls an operation of the second power converter;

a first line breaker that is arranged on the power line that transmits a direct-current power to be transferred between different vehicles of the railroad vehicle system and that is controlled by the first control device; and a second line breaker that is arranged on the power line and is controlled by the second control device, wherein the first power storage device is arranged in one vehicle of the railroad vehicle system and is controlled by the first control device, the second power storage device is arranged in another vehicle of the railroad vehicle system, which is different from the one vehicle, and is controlled by the second control device, and when an occurrence of an abnormality in the direct-current common unit is detected in accordance with a voltage value and/or a current value detected in the direct-current common unit, the first control device controls the first line breaker such that the first line breaker is off, causes the first input/output end side of the first power converter to be connected to the overhead line, and causes the first power converter to operate as a DC/DC converter to thereby allow power from the first power storage device to be supplied to the second power converter, and the second control device controls the second line breaker such that the second line breaker is off, causes the first input/output end side of the second power converter to be connected to the overhead line, and causes the second power converter to operate as a DC/AC converter to thereby allow power from the first power converter to be supplied to the second motor.

4. A propulsion control apparatus for a railroad vehicle system, the railroad vehicle system including at least two vehicles connected via a power line, comprising:

a first power converter to which a direct-current power from a direct-current common unit is input from a first input/output end side and which supplies, via a second input/output end side, an alternating current power for driving a first motor that generates a driving power for the railroad vehicle system;

a second power converter to which a direct-current power from the direct-current common unit is input from a first input/output end side and which supplies, via a second input/output end side, an alternating-current power for driving a second motor that generates a driving power for the railroad vehicle system;

a first power storage device that is configured to be able to connect to the second input/output end side of the first power converter and that is charged with a direct-current power supplied from the second input/output end side of the first power converter or discharges a direct-current power to the second input/output end side of the first power converter;

a second power storage device that is configured to be able to connect to the second input/output end side of the second power converter and that is charged with a direct-current power supplied from the second input/output end side of the second power converter or discharges a direct-current power to the second input/output end side of the second power converter;

a first control device that controls an operation of the first power converter;

a second control device that controls an operation of the second power converter;

a first line breaker that is arranged on the power line that transmits a direct-current power to be transferred between different vehicles of the railroad vehicle system and that is controlled by the first control device; and a second line breaker that is arranged on the power line and is controlled by the second control device, wherein the first power storage device is arranged in one vehicle of the railroad vehicle system and controlled by the first control device, the second power storage device is arranged in another vehicle of the railroad vehicle system, which is different from the one vehicle, and controlled by the second control device, and when an occurrence of an abnormality in the direct-current common unit is detected in accordance with a voltage value and/or a current value detected in the direct-current common unit, the second control device controls the second line breaker such that the second line breaker is off, causes the first input/output end side of the second power converter to be connected to an overhead line, and causes the second power converter to operate as an AC/DC converter to thereby allow regenerative power from the second motor to be supplied to the first power converter, and the first control device controls the first line breaker such that the first line breaker is off, causes the first input/output end side of the first power converter to be connected to the overhead line, and causes the first power converter to operate as a DC/DC converter to thereby allow the first power storage device to be charged with power from the second power converter.

* * * * *